United States Patent
Gessner et al.

(10) Patent No.: US 6,971,146 B2
(45) Date of Patent: Dec. 6, 2005

(54) FASTENING SPRING

(75) Inventors: Volker Gessner, Salz (DE); Harald Schelbert, Bad Koenigshofen (DE)

(73) Assignee: Preh-Werke GmbH & Co. KG, Bad Neustadt (DE)

( * ) Notice: Subject to any disclaimer, the term of this patent is extended or adjusted under 35 U.S.C. 154(b) by 0 days.

(21) Appl. No.: 10/383,069

(22) Filed: Mar. 7, 2003

(65) Prior Publication Data

US 2003/0167604 A1    Sep. 11, 2003

(30) Foreign Application Priority Data

Mar. 8, 2002    (DE) ............................... 102 10 383

(51) Int. Cl.⁷ ................................. F16B 2/20
(52) U.S. Cl. ......................... 24/295; 24/293
(58) Field of Search .................. 24/295, 293, 294, 24/297, 292, 289

(56) References Cited

U.S. PATENT DOCUMENTS

| | | | | |
|---|---|---|---|---|
| 2,751,106 A | * | 6/1956 | Schrader | 24/295 |
| 2,976,972 A | * | 3/1961 | Raymond | 24/294 |
| 3,248,078 A | | 4/1966 | Ast | |
| 3,631,569 A | * | 1/1972 | Seckerson et al. | 24/295 |
| 4,683,622 A | * | 8/1987 | Oehlke | 24/297 |
| 5,288,121 A | * | 2/1994 | Graves | 296/146.9 |
| 5,347,690 A | * | 9/1994 | Mansoor et al. | 24/295 |
| 6,327,758 B1 | * | 12/2001 | Petrakis et al. | 24/295 |

FOREIGN PATENT DOCUMENTS

| | | |
|---|---|---|
| CH | 346923 | 7/1960 |
| DE | 1 936 758 | 4/1966 |
| DE | 1 765 487 | 7/1971 |
| DE | 24 46 994 | 3/1976 |
| DE | 28 33 823 A1 | 2/1980 |
| DE | 87 08 426 U1 | 9/1987 |
| DE | 37 09 970 A1 | 10/1988 |
| DE | 41 28 114 C2 | 2/1993 |
| DE | 695 03 316 T2 | 7/1998 |
| DE | 20102226 U1 | 7/2001 |
| DE | 201 13 304 U1 | 1/2002 |
| GB | 1 150 079 | 4/1969 |
| GB | 1 591 266 | 6/1981 |
| GB | 2 187 499 A | 9/1987 |

* cited by examiner

Primary Examiner—Robert J. Sandy
(74) Attorney, Agent, or Firm—Birch, Stewart, Kolasch & Birch, LLP

(57) ABSTRACT

A fastening spring that includes a tolerance zone and a restraint zone. The tolerance zone has a steep incline and the adjoining restraint zone has a flat incline. This allows for tolerance compensation that is increased by the disassembly strength. Furthermore, the fastening spring can be easily manufactured and allows for a damage-free disassembly and assembly of a first component into a second component.

19 Claims, 1 Drawing Sheet

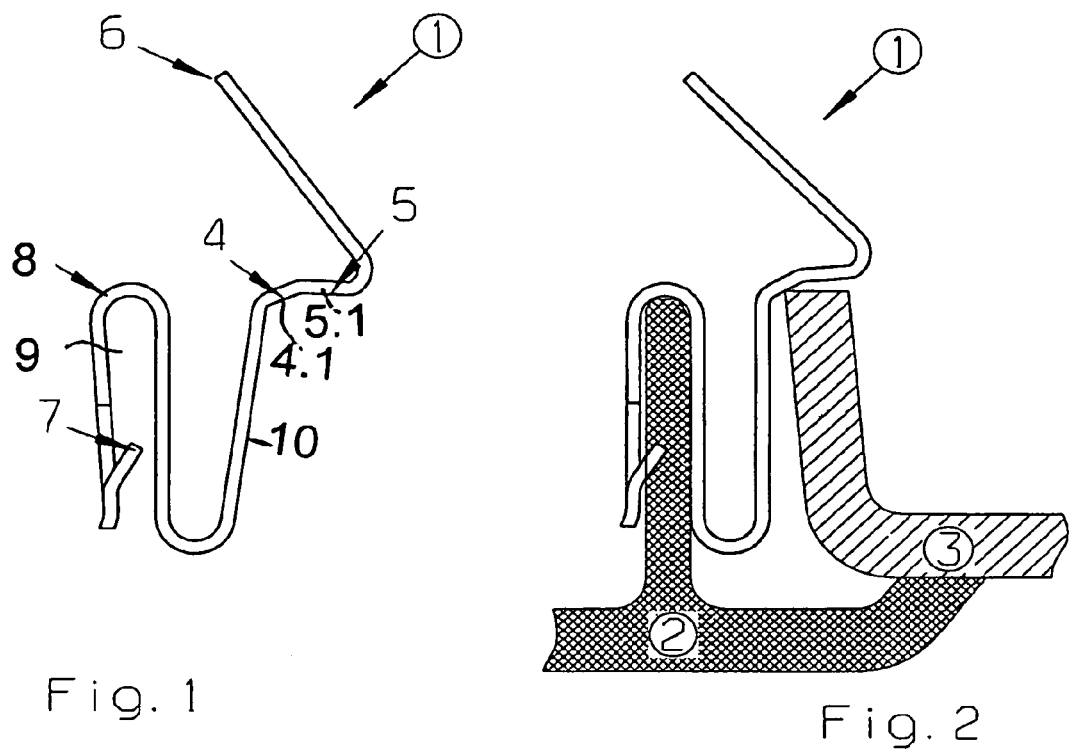
Fig. 1
Fig. 2
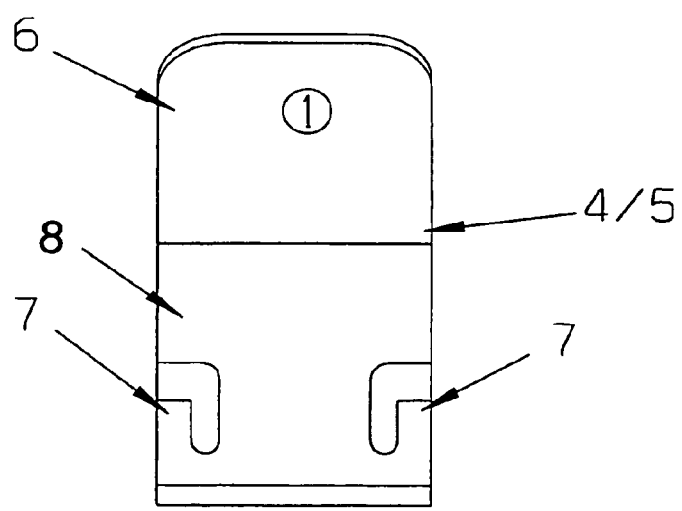
Fig. 3

FASTENING SPRING

This non-provisional application claims priority under 35 U.S.C. §119(a) on patent application No. 102 10 383.6 filed in Germany on Mar. 8, 2002, which is herein incorporated by reference.

BACKGROUND OF THE INVENTION

1. Field of the Invention

The present invention relates to a fastening spring for fastening structural components.

2. Description of the Background Art

DE 201 13 304 U1 discloses a vehicle-interior module, whereby components are mounted over stop springs, which also have a contact function. The stop spring has the shape of an incomplete D.

DE 37 09 970 C2 discloses a device to fasten housings in the openings of an electrical control panel or a screen wall. In this case, the fastening elements are wave-shaped.

Particularly in vehicle technology, a fastening spring or stop spring is needed that can be used universally, i.e., which allows a tolerance compensation necessitated by constructional conditions, for example, varying component heights, different fastening points of the stop spring, etc. It is known that the steeper the contact surface of the fastening spring or stop spring is to the contact edge of its counterpart, to which the stop-spring equipped component is to be attached, the greater the tolerance compensation of the stop spring will be, however, the disassembly strength increasingly declines. Although stop springs with a flat contact surface achieve high disassembly strength, they only allow little tolerance compensation.

SUMMARY OF THE INVENTION

It is therefore an object of the present invention to provide a fastening spring that has a high tolerance compensation and enables high disassembly strengths. The invention incorporates a tolerance zone and a restraint zone into the actual fastening sector of the fastening spring, whereby the tolerance zone features a steep incline and the adjoining restraint zone features a flat incline. This allows for tolerance compensation that increases the disassembly strength. This spring geometry of the fastening spring is easily manufactured and provides damage-free disassembly and assembly.

Through this spring geometry, possible tolerance compensation and disassembly strength of the spring type can be varied desirably.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a side view of a fastening spring according to a preferred embodiment;

FIG. 2 illustrates an assembled fastening spring according to a preferred embodiment; and FIG. 3 is a front view of a fastening spring according to a preferred embodiment.

DETAILED DESCRIPTION OF THE PREFERRED EMBODIMENTS

FIG. 1 illustrates a fastening spring or stop spring 1, which presses a first component 2 against, or into, a second component 3. For this purpose, the fastening spring 1 is firmly attached to component 2.

As illustrated, the fastening spring 1 has a fastening zone 8. Adjoining the fastening zone 8 is a tolerance zone 4 and a restraint zone 5, as well as an entry zone 6. The tolerance zone 4 has a steep incline 4.1, while the adjoining restraint zone 5 has a flat incline 5.1.

The purpose of the fastening zone 8 is for the safe and simple fastening of the fastening spring 1 to the first component 2, which can be made of, for example, a plastic or metal. The fastening spring 1, containing the first component 2, is then pressed against or into the second component 3. A U-shaped contour of this fastening zone 8 encloses a rib or protrusion of the first component 2. Two claws 7, which can be made of steel, extend diagonally into an opening 9 formed by the U-shaped contour interior, in order to enable simple assembly into the first component 2 while preventing the extraction or removal of the fastening spring 1 during disassembly.

Additionally, generally known ways for fastening the fastening spring 1 to the first component 2 can be applied.

FIG. 3 illustrates the fastening spring 1 in a front view.

In order to easily snap the fastening spring 1 during the assembly of the first component 2 into the second component 3, the fastening spring 1 contains slightly rounded sides and a steep entry zone 6. Furthermore, the fastening spring 1 contains a compression zone 10 that is positioned between the fastening zone 8 and tolerance zone 4. This compression zone 10 provides a force that fixedly secures the tolerance zone 4 to the second component 3.

The general shape of the fastening spring 1 is not limited to the one thus described. It is possible to equip different spring geometries with a tolerance zone 4 and a restraint zone 5.

The preferred material for the fastening spring 1 is spring steel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fastening spring for fastening a first component to a second component, the fastening spring comprising:
    a fastening zone, the fastening zone fixedly securing the first component to the fastening spring;
    a tolerance zone;
    a biasing zone being provided between the fastening zone and the tolerance zone; and
    a restraint zone,
    wherein the tolerance zone has a steep incline and the adjoining restraint zone has a flat incline, wherein the biasing zone provides a biasing force such that the tolerance zone imparts a force to a portion of the second component, and wherein both the fastening zone and the biasing zone are each formed by only one U-shaped element, openings of each of the U-shaped elements facing in opposite directions.

2. The fastening spring according to claim 1, wherein a plastic or metal part can be mounted into the fastening zone.

3. The fastening spring according to claim 1, wherein the fastening zone and the biasing zone are directly connected to each other solely by a generally straight element.

4. The fastening spring according to claim 2, further comprising at least two diagonally extending steel claws within the fastening zone.

5. The fastening spring according to claim 1, further comprising an entry zone having slightly rounded sides and a steep incline, and being located adjacent to the restraint zone.

6. The fastening spring according to claim 1, wherein the fastening spring is made of spring steel.

7. The fastening spring according to claim 1, wherein each of the U-shaped elements of the fastening zone and the biasing zone have first and second legs that are generally straight elements, and wherein the second leg of the fastening zone and the second leg of the biasing zone are shared.

8. A fastening spring comprising:
a fastening zone for receiving and fixedly securing a first component;
a restraint zone; and
a tolerance zone located between the restraint zone and the fastening zone, the tolerance zone being inclined with respect to the restraint zone,
wherein the tolerance zone and the restraint zone facilitate fastening of the first component to a second component,
wherein a biasing zone is positioned between the fastening zone and the tolerance zone, the biasing zone providing a force for fixedly securing the tolerance zone to the second component, and
wherein both the fastening zone and the biasing zone are each formed by only one U-shaped element, openings of each of the U-shaped elements facing in opposite directions.

9. The fastening spring according to claim 8, further comprising an entry zone adjacent to and inclined to the restraint zone, the entry zone facilitating insertion of the fastening spring into the second component.

10. The fastening spring according to claim 9, wherein the entry zone is inclined in an opposite direction than the tolerance zone.

11. The fastening spring according to claim 8, wherein the fastening zone comprises a securing device for fixedly securing the first component into an opening formed by the fastening zone.

12. The fastening spring according to claim 11, wherein the opening is formed by the U-shaped element of the fastening zone.

13. The fastening spring according to claim 8, wherein an edge of the second component abuts against a portion of the tolerance zone in a fastened position.

14. The fastening spring according to claim 8, wherein the fastening spring is made of a material that is able to flex.

15. The fastening spring according to claim 8, wherein the fastening zone, biasing zone, tolerance zone, and restraint zone are formed from a continuous piece of material.

16. The fastening spring according to claim 8, wherein the fastening spring facilitates insertion and removal of the first component into and from the second component.

17. The fastening spring according to claim 8, wherein a protrusion of the first component extends into the fastening zone.

18. The fastening spring according to claim 8, wherein the fastening zone and the biasing zone are directly connected to each other solely by a generally straight element.

19. The fastening spring according to claim 8, wherein each of the U-shaped elements of the fastening zone and the biasing zone have first and second legs that are generally straight elements, and wherein the second leg of the fastening zone and the second leg of the biasing zone are shared.

* * * * *